United States Patent [19]
Tertilt

[11] 3,915,000
[45] Oct. 28, 1975

[54] PROCESS AND DEVICE FOR THE MEASUREMENT OF THE FLOW VELOCITY OF A FLUID

[75] Inventor: Albert Tertilt, Rohrken, Germany

[73] Assignee: Firma Paul Pleiger Maschinenfabrik, Im Hammertal, Germany

[22] Filed: Mar. 7, 1973

[21] Appl. No.: 338,949

[30] Foreign Application Priority Data
Mar. 10, 1972 Germany............................ 2211694

[52] U.S. Cl. .................................................. 73/204
[51] Int. Cl.² ........................................... G01F 1/68
[58] Field of Search.............................. 73/204, 211

[56] References Cited
UNITED STATES PATENTS

| | | | |
|---|---|---|---|
| 1,261,086 | 4/1918 | Wilson | 73/204 |
| 2,038,511 | 4/1936 | Kortlandt | 73/204 |
| 2,718,144 | 9/1955 | Hornfeck | 73/205 D |
| 2,731,826 | 1/1956 | Wiley | 73/204 |
| 3,147,618 | 9/1964 | Benson | 73/204 |
| 3,369,402 | 2/1968 | Elagib | 73/204 |
| 3,548,637 | 12/1970 | Wicks | 73/204 |

FOREIGN PATENTS OR APPLICATIONS

| | | | |
|---|---|---|---|
| 320,812 | 5/1920 | Germany | 73/204 |

*Primary Examiner*—Herbert Goldstein

[57] ABSTRACT

Process and device for measuring the flow velocity of a fluid utilizable even in inflammable fluids, very low flow rates, and very low pressures. Energy from the variation in fluid temperature due to internal friction is used for measurement purposes, eliminating the necessity of an exterior energy source.

8 Claims, 10 Drawing Figures

PROCESS AND DEVICE FOR THE MEASUREMENT OF THE FLOW VELOCITY OF A FLUID

BACKGROUND OF THE INVENTION

The invention concerns a process for the measurement of the flow velocity of a fluid and a device for carrying out this process.

For the purpose of measuring the flow velocity of a stream of gas, for example, it is well known from the German Offenlegungsschrift No. 1,817,500 or the German Gebrauchsmuster No. 1,876,734 how to install two electrically heated thermo-sensitive elements one after the other in a region or in a restricition where they will be cooled differently by the stream of gas, these elements being connected to an electrical measurement circuit. When this is done, sufficient energy must be supplied to the measurement elements so that their temperature is always higher than that of the gas. For example, such a measurement system cannot be utilized in high pressure hydraulics when there is highly heated hydraulic oil or in the case of inflammable fluids. The possibilities for application are also limited by the fact that such a measurement device does not respond very rapidly, particularly in the presence of small quantities of flow, and in certain cases cannot be installed because of the space requirements which are necessary.

SUMMARY OF THE INVENTION

This invention has as its object the design of a process for the measurement of the flow velocity of a fluid while avoiding the disadvantages of well-known processes, in such a way that it can be utilized universally and can be installed for the purpose of making a rapid determination of measurement values for all fluids, even inflammable fluids, at very low rates of flow, and in any pressure range. In addition, it is intended to provide a simple device for carrying out this process which makes measurements possible at points on a stream line which to date have not been accessible and which makes rapid measurement value transmission possible over greater distances.

The process in accordance with this invention is characterized by the fact that on a stream line, preferably in the region of a variation in the cross section of the flow or in the area of a point of disturbance in the flow of the fluid, the temperature of the fluid is measured at points located at different intervals and by the fact that the flow velocity will be determined from the measured temperature difference.

While with well-known processes, outside energy has to be applied for the purpose of heating the measurement elements, in this invention, the variation in the temperature of the fluid which occurs due to the internal friction on a stream line is utilized for measurement purposes so that no supply of outside energy is necessary. Therefore, it is possible to carry out measurements as well in inflammable fluids without difficulty. Variations in the temperature of a fluid occur primarily at a point of disturbance in the flow or in the region of a variation in the cross section of the flow. In the case of a liquid which flows through a throttle, an increase in the temperature can be determined at the outlet of the throttle compared to the flow in front of the throttle, while a decrease in the temperature occurs in the case of a gaseous fluid due to expansion. In both cases, the variation in temperature which is determined can be used for the purpose of determining the flow velocity. By means of using suitable measurement elements, for example, thermocouple elements, even very small rates of flow can be determined rapidly and reliably. The flow velocity and therefore the volume flow can be determined by means of calibration curves which state the relationship of these values to the variation in temperature for a particular measurement point and for the fluid in question.

By way of example, in high pressure hydraulics, an increase in temperature, which is due to internal friction, occurs in the course of flowing through a throttle. In accordance with this invention, this increase in temperature is used as a reference quantity for the determination of the flow velocity and volume by means of the fact that the temperature of the fluid is measured in the region of normal flow in front of the throttle and at such a point behind the throttle at which an essentially constant behavior of the temperature is displayed or else at which the flow is again undisturbed.

In accordance with a further advantageous development of this process, the temperature of the fluid is measured in front of a throttle in the region of normal flow and near the outlet of the throttle opening in a region of the stream in which an intensified variation in the temperature or increase in the temperature occurs. It was determined that an increase in temperature occurs directly at the outlet of a throttle opening in the case of liquids which, depending upon the pressure difference and the properties of the liquid, can be considerably above the temperatures increase found in the region of the flow which has normalized again behind the throttle. As experiments showed, this intensified increase in temperature directly at the outlet of a throttle is a function of the kinetic energy of the flow similar to the pressure term in the Bernoulli equation. Thus the flow velocity can be determined as a function of the measured difference in temperature by means of calibration curves, while taking the various other parameters into consideration. With a gaseous fluid also, an intensified decrease in temperature can be determined which can be utilized for the purpose of measurement in an analogous way.

It is also possible to measure the temperature of the fluid near the outlet of the throttle opening or in the region of an expansion in the line or flow cross-section and in the region of the expanded cross section of the flow where an essentially constant behavior of the temperature occurs once again. In the case of the above arrangement of the measurement points, a temperature difference can be determined as well between the intensified variation in temperature directly at the outlet of the throttle or of the narrower section of the line and in the region where the temperature has been equalized again by and large throughout the cross section of the flow.

In order to compensate for any asymmetries in the distribution of the temperature which may occur, the temperature of the fluid can be measured at several points near a cross sectional plane of a stream line or in the region of the variation in the cross seection, so that the mean measurement value can be obtained.

In accordance with another further development, the influence of the ambient temperature on the viscosity of the fluid can be compensated for by means of at least one supplementary measurement point. This measurement in cases where the viscosity is measureably affected by the ambient temperature is used as a correction factor in determining the flow velocity.

For the device of this invention used in carrying out the process of this invention, at least two temperature-sensitive indicators in the form of thermocouple elements or other suitable measurement value transmitters such as semiconductors are installed at a distance from each other on the stream line or in the region of a variation of the cross section of the flow or of the point of disturbance, and their connection lines are passed through the wall of the pipeline for the purpose of transmitting the measurement values to a reading or recording device. Measurement elements of this type can be designed to be very small and can be installed at points which to date have not been accessible, and in very small throttle holes. The measurement values, in the form of voltage signals, can be transmitted in a simple way to a reading or recording device which can be installed at any arbitrary site at a distance from the measurement point. In addition, such measurement elements respond rapidly even in the presence of slight variations in temperature due to their very small mass so that one practically obtains an instantaneous indication of the measurement value. This is advantageous, for example, in situations involving the brief loading of a fluid-operated element or in cases involving the brief opening of a valve in high pressure hydraulic systems.

Compared to a separated arrangement of the measurement points, it is more advantageous — particularly in the case of a throttle or of an expansion in the cross section of the line — to install an electrically conductive wire with thermocouples along the central axis of the flow path. This serves to conduct the current into the throttle hole and improves the stability of the measurement points in the flow.

The measurement elements can be installed along the axis of the flow path on both sides of a throttle point, following the throttle point, or in the region of an expansion in the cross section of the flow. In order to be able to determine and measure a flow in both directions through a throttle, the measurement points in front of and following the throttle must be installed symmetrically with respect to the throttle.

If the flow velocity is to be measured in a very narrow line, then a section with a larger diameter can be installed in the line, in which a stop is provided with a throttle hole, so that the diameter of the throttle hole corresponds to the diameter of the line and the measurement elements are installed in the region of the above-mentioned throttle hole.

If the flow velocity is to be determined in a fluid line with a larger diameter, then a stop with several throttle holes can be inserted in the line, so that the area of the cross section of these throttle holes corresponds to the necessary volume flow and the measurement elements can be installed in the region of one or more of these throttle holes.

DESCRIPTION OF THE PREFERRED EMBODIMENT

The invention is explained in greater detail below by way of example and drawings.

Figure 1:
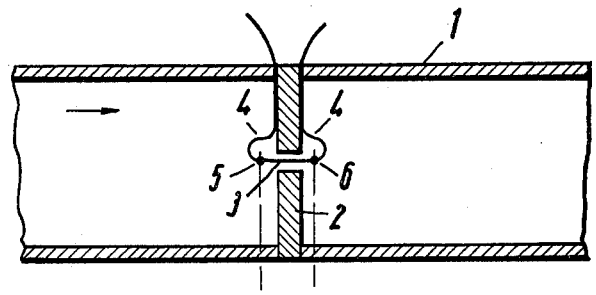
FIG. 1 schematically illustrates a cross section through a fluid line with a throttle point in which two thermocouple elements are installed for the purpose of measuring the temperature of the fluid.

FIG. 1 shows a pipeline 1, in which a stop-shaped throttle 2 is installed. A wire 3 which is made of constantan runs along the axis of the throttle holes and, at the points of connection with two iron wires 4, forms the thermocouple elements 5 and 6 which can, for example, be installed 0.8 mm in front of or after the designated surface of the stop disc. In one exemplified embodiment, the diameter of the throttle hole is 0.5 mm and the diameter of the constantan wire is 0.2 mm. The two iron wires 4 are passed through the wall of the pipe for the purpose of transmitting the measurement values. By way of example, they can be connected to electrically conductive tracks — as indicated in FIG. 1 — which are pressed onto the stop disc in a well-known way.

Figure 2:
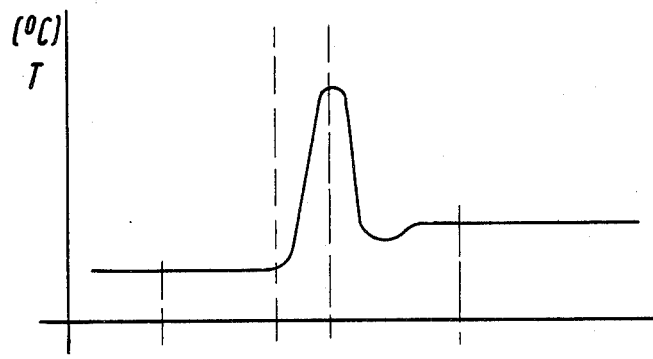
FIG. 2 shows the behavior of the temperature of the fluid in the axis of the throttle hole of the throttle illustrated in FIG. 1.

If hydraulic oil is passed through the pipeline 1, by way of example, then if it is under such a pressure that a pressure drop on the order of magnitude of 50 atm gauge occurs at throttle point 2, then the temperature behavior which is shown schematically in FIg. 2 is obtained along the axis of the throttle hole. If the hydraulic oil has a temperature of 20°C in the region of the normal flow in front of the throttle at measurement point 5, then a temperature of 47°occurs at measurement point 6 so that an increase in the temperature of 27°C is produced. In the further course of the flow along the axis of the throttle hole, the temperature decreases relatively rapidly and then, after a slight increase during the further course of the flow, it remains essentially constant after an equalization of the temperature has taken place throughout the cross section of the flow. This constant temperature in the region of the flow which has become normal again is approximately 25°C, that is, 5°C above the temperature in the region of the normal flow in front of the throttle. In this example, the quantity of flow was 0.7 liters per minute.

The signal which occurs between the thermocouple elements on the basis of the temperature difference can be transmitted directly to a customary measurement instrument and used for the purpose of determining the flow velocity. It was found that the dependency of the flow velocity upon the temperature difference at measurement points 5 and 6 corresponds approximately to the dependency upon the pressure difference in the Bernoulli equation. The various parameters such as the viscosity, thermal content, characteristics of the throttle, etc. can be taken into consideration. Thus, by calibrating the measurement device accordingly, it is possible to determine the flow velocity and the volume flow on the basis of the measured temperature difference.

An increase in the temperature at the measurement point 6 can, by way of example, also still be determined clearly even at a pressure difference of 1.5 atm gauge and less, so that even very small quantities of flow can be measured.

Because of the very brief response time of the thermocouple elements 5 and 6, it is also possible to determine extremely small quantities of flow within milliseconds, something which is not possible with present well-known measurement processes. By means of the symmetrical arrangement of the measurement points with respect to throttle 2, the flow velocity can be measured independently of the direction and the direction of the flow can be determined by means of the polarity. The temperature of the fluid is compensated for by means of the measurement points which are located very close to each other (for example, 2 mm), which makes it unnecessary to install an additional comparative measurement point in the line when thermocouple elements are used.

If necessary, the signal which is transmitted through the connection of several measurement points in series can be amplified accordingly. By means of integrating devices such as counters which are installed farther along on the line, the total flow can be determined for a certain period in both directions even if the flow velocity does not remain constant.

Figure 3:
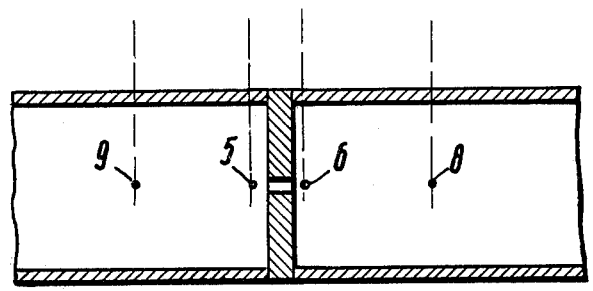
FIG. 3 schematically shows various possible installations of the measurement points.

FIG. 3 shows additional possibilities for the arrangement of the measurement points. For example, the thermocouple element 6 can be located near the outlet of the throttle hole in the region of the intensified temperature increase and an additional thermocouple element 8 can be located in the region of the flow which is normal again. This means that one also obtains a temperature difference, as can be seen from FIG. 2, which is 22°C in the case of the exmple stated above. An additional possibility consists of connecting thermocouple element 8 to thermocouple element 5, which means that the increase in temperature which is caused by the internal friction is obtained in the normal flow and is 5°C in the case of the example given above. For the purpose of determining the flow velocity in both directions, the measurement points can be arranged symmetrically to the throttle as is shown by means of an additional thermocouple element 9 in FIG. 3.

Figure 4:
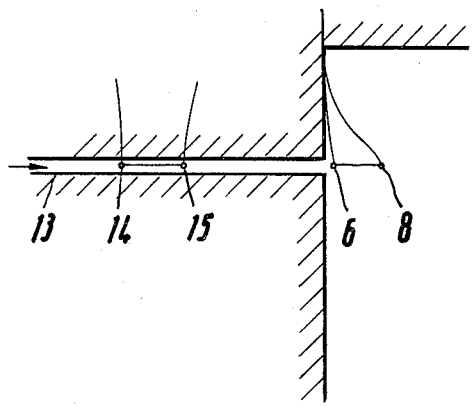
FIG. 4 shows an arrangement of measurement points in the region of an expansion of the cross section of the flow in a narrow fluid line.

When a throttle is used, it is preferable to use a measurement point arrangement such as that which is shown in FIG. 1 for measuring the flow velocity or the volume flow since this makes it possible to obtain a temperature difference which can be determined clearly, even at a very slight pressure difference. It is possible to provide an arrangement of the measurement points 6 and 8 as in FIG. 3, by way of example, when it is intended to make a measurement at the outlet of a line which empties into a larger space, as is represented in FIG. 4 at the outlet of a narrow line 13. This FIG. 4 also shows an additional possibility of application for the process of this invention. Two thermocouple elements 14 and 15 are located at a distance from each other in line 13, for example, in the axis of the flow. As can be seen from FIGS. 1 and 2, the temperature of the fluid increases to a relatively great extent in the course of flowing through a narrow line due to the internal friction. With this arrangement of measurement points 14 and 15, a portion of the increase of temperature which occurs in the narrow line is utilized for measurement purposes.

Figure 5:
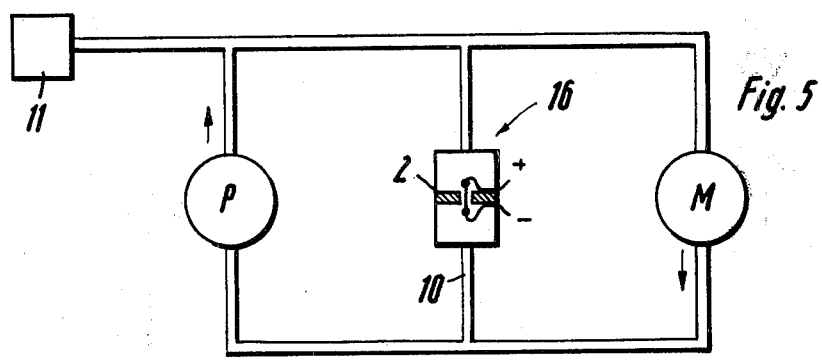
FIG. 5 shows the arrangement of a measurement device in a narrow fluid line for the purpose of determining the pressure which is built up in a line.

When it is intended to make a measurement in a very narrow fluid line and sufficient room is available, then a measurement device can be installed in this line as is shown by device 16 in FIG. 5. This measurement device 16 consists of a chamber which is expanded compared to the cross section of the line, and a throttle 2 which is placed in it; the hole of this throttle can have the same cross sectional area as that of the line. The construction and the arrangement of the measurement device will be made easier by means of such a design. FIG. 5 illustrates an additional possibility for application of the measurement process of this invention. The measurement arrangement, together with the throttle 2 and the thermocouple elements, is located in a bypass line 10 which is joined to the connection lines of a pressure generator P and a receiver M. A relief valve jet is designated 11. The pressure which builds up in the line between the pressure generator P and the receiver M can be determined and checked by measuring the temperature at throttle 2, as described above, since the pressure which has built up is measured, for example, by using a calibration curve which shows the dependency of the pressure difference upon the temperature difference which has been determined at the throttle.

Figure 6:
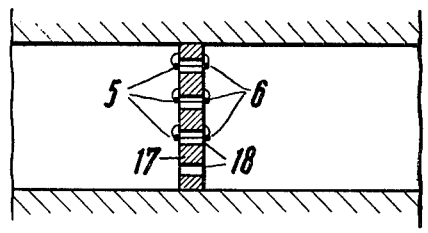
FIG. 6 shows a cross section through a fluid line in which an orifice plate has been installed with several orifices for the purpose of enlarging the cross section of flow.

As shown in FIG. 6, a stop 17 with several throttle holes 18 can be installed in this line for the purpose of measuring the flow velocity in a fluid line with a larger diameter. The diameter of the holes 18 can be designed in such a way that the entire cross sectional area of the holes 18 corresponds to the necessary volume flow. This makes it possible to locate measurement points 5 and 6 in one of these holes 18 or in several holes, which means that an amplification of the signal can be obtained.

Figure 7A:
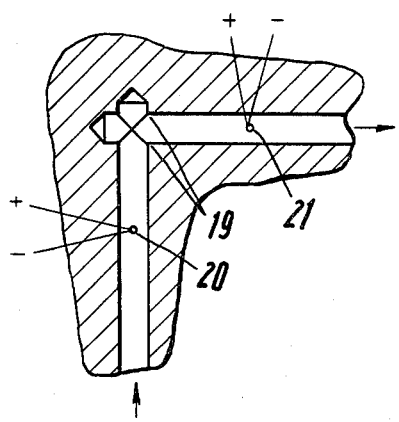
FIGS. 7a and 7b show the measurement process at a disturbance point in a flow of fluid, where the disturbance point is formed by means of sharp edges in the fluid line (FIG. 7a) or by means of an element which extends into the flow of fluid (FIG. 7b)

Since a change in the temperature occurs at each disturbance point on a stream line due to the formation of vortices and the friction which is associated with this, structural characteristics can also be utilized with the process of this invention in order to determine the flow of a fluid. Such an exemplified embodiment is shown schematically in FIG. 7a, which illustrates a connection point between two holes which are located at right angles to each other, for example, in a lubrication system. By means of edges 19 which are present at this connection point and due to the deflection of the flow, disturbance points are produced which lead to a vortex formation in the oil and consequently to an increase in the temperature of the oil. By means of a suitable arrangement of measurement points 20 and 21, it can be determined on the basis of this variation in temperature whether there is a flow through the line. Frequently, in the case of such an application, it is important above all to determine whether there is any flow whatsoever in the line concerned. This is possible in a simple way, for example, in the case of the arrangement in accordance with FIG. 7a.

Figure 7B:
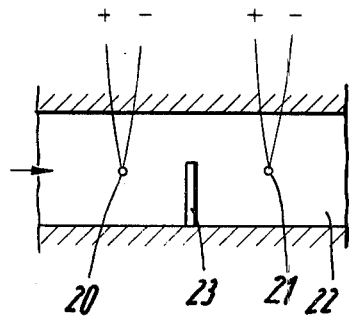

FIG. 7b is a schematic illustration of an additional possible arrangement of a disturbance point in the flow of the fluid. An element 23 is located in a fluid line 22 and extends into the flow; it causes the formation of vortices and therefore a variation in the temperature of the fluid which can be determined by means of measurement elements 20 and 21, one of which is located in front of and the other after the disturbance point 23. Disturbance point 23 can also, by way of example, be formed by means of a rod or the like which crosses line 22. Such an arrangement according to FIG. 7b can be used, for example, when it is intended to determine an increased flow in a line. For this purpose, for example, the measurement point 21, which is located downstream, can be arranged in such a way that it is located essentially outside the vortex region at a given low flow velocity, while it lies inside the vortex region of disturbance point 23 for the purpose of determining the temperature difference which has been provoked in the case of a high flow velocity.

In the case of hydraulic oil and other liquid fluids, the viscosity is changed by the ambient temperature. When the ambient temperature is higher and the viscosity therefore lower, then the frictional loss and thus the increase in temperature is subsequently less than in the case of a higher viscosity or a lower ambient temperature. This influence of the variation in viscosity, which is approximately 2 to 3% per °C depending upon the type of oil, can be compensated for upon measuring the flow in accordance with the process of this invention. The equation for the influence of the temperature on the viscosity in the case of oils is relatively complicated and requires a relatively high effort in circuit engineering for an exact temperature compensation. By way of example, if NTC resistances — which have a variation in resistance of 2 to 6% °C (that is, resistances with a negative temperature coefficient) — are used for the circuitry of the amplifiers and if the resistance is installed in the fluid, then the amplification factor can be influenced corresponding to the variation in the resistance.

Figure 8:
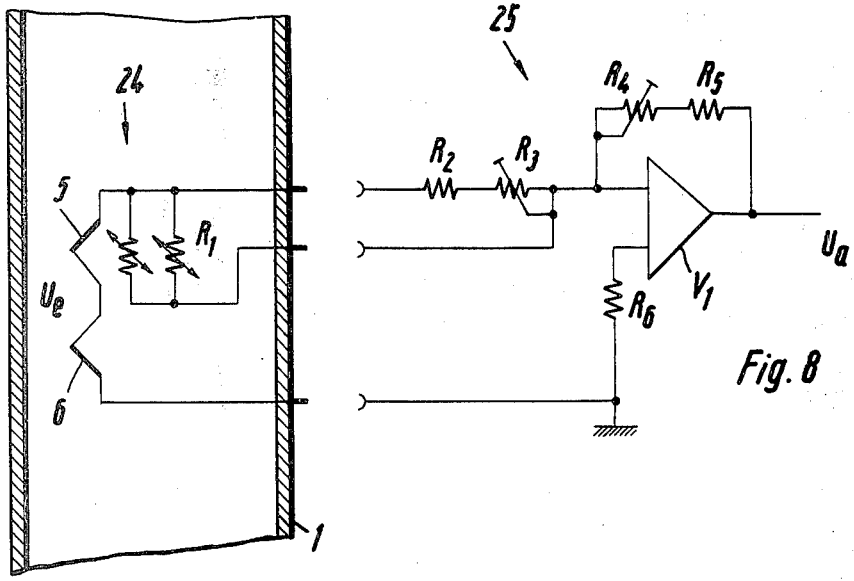
FIG. 8 shows the electric circuit of a measurement device of the present invention and of an amplifier which compensates for the viscosity.

Such a circuit is shown in FIg. 8 as an example. The measurement arrangement which is located in pipeline 1 is designated 24, where $U_e$ is the input voltage, 5 and 6 are the thermocouple elements, and $R_1$ are NTC resistances. In the amplifier element which is located outside pipeline 1, the resistances are designated R, the amplifier $V_1$, and the output voltage $U_a$, it being possible to apply these to a measurement device or a recording device. The influence of the temperature on the viscosity can be adjusted by the resistance $R_3$, while the viscosity itself will be adjusted in accordance with a calibration table with the resistance $R_4$. This amplifier according to FIG. 8 has the following amplification, for example:

$$U_a = -U_e \cdot \frac{R_4 + R_5}{\frac{(R_2 + R_3) \cdot R_1/2}{R_1/2 + R_2 + R_3}}$$

According to this, the amplification is proportional to the resulting resistance $R_4 + R_5$ and inversely proportional to the input resistance consisting of the connection in parallel of the NTC resistances $R_1$ to the resistances $R_2 + R_3$. Thus the influence of the NTC resistances can be adjusted to 2% per °C, for example, with the compensating resistance $R_3$.

Figure 9:
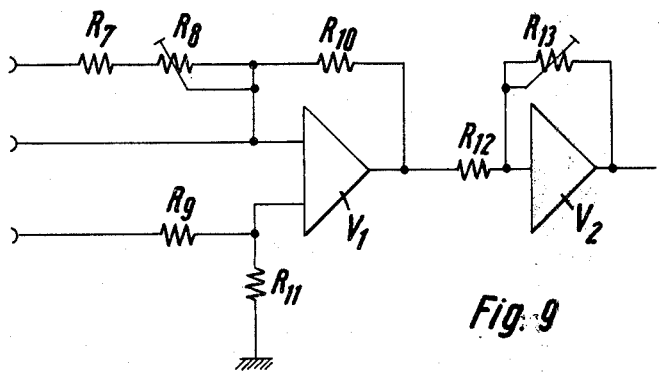
FIG. 9 shows the circuit of a differential amplifier.

A difference amplifier with amplifiers $V_1$ and $V_2$ is shown in FIG. 9. In contrast to the circuit of FIG. 8, zero point shifts which can occur due to variation in the input resistance (NTC resistances) are compensated for automatically with this amplifier. In order to make it possible to design this circuit symmetrically ($R_{10} = R_{11}$), the viscosity at amplifier $V_2$ is adjusted with the resistance $R_{13}$.

When a throttle point is used for the purpose of measuring the flow velocity, the influence of the viscosity can be compensated for with one NTC resistance $R_1$ (FIG. 8) each in front of the throttle and after it.

Since it is possible in the case of the measurement process in accordance with this invention to arrange the measurement points very simply and with a saving of space, due to the fact that the measurement results can also be transmitted and recorded without difficulty even over relatively great distances, and finally, since even a very small volume flow (for example, 0.1 liter per minute) can be determined practically instantaneously, there are numerous application possibilities. For example, remote measurement of the flow is possible in the field of high pressure hydraulics, and the pressure, torque, and rpm can be determined from the measurement values which are obtained.

These measurement values can be shown simply and in a clear way at the control panel. It is possible to record the measurement values without difficulty since the measurement quantity, which is a few mV in the case of thermocouple elements, can be connected directly to customary devices without the need for additional transmitters. On account of the relatively low measurement voltage, safety from explosion is achieved, for example, as is required in the case of tankers. Above all, it is possible by means of the invention to carry out flow and pressure measurements at flow resistances which have not been possible to date, for example, due to structural difficulties. For example, an acknowledgement signal is easily possible in important lubrication systems by measuring the temperature in accordance with this invention, and this permits the operation of the lubrication system to be monitored. An additional possibility consists in the fact that this process can be used for the linearization and stabilization of hydraulic control elements for the purpose of forming a return quantity. In particular, very economical possibilities exist for the construction of precise servo-valves. An additional exemplified embodiment is the measurement of the fuel consumption in the case of a motor vehicle, whereby only a throttle with measurement points needs to be installed in the fuel line. This permits a sufficient volume flow, as is shown in FIG. 6.

A measurement device in accordance with this invention can, by way of example, also be used for the purpose of indicating position. For example, holes for the lubricant are installed in the reamer of a reaming machine. As described above, measurement points for the purpose of temperature measurement can be arranged in such a lubricant hole. When the reamer is drawn out of a hole which is being reamed, the cross section of the lubricant hole suddenly becomes free so that an increased flow occurs which will be determined by means of the measurement elements. The signal can be transmitted to a device which shuts off the supply of lubricant so that no unnecessary loss of lubricant occurs.

The measurement process of this invention can also be used in the case of gaseous fluids as well, where a temperature drop occurs due to expansion of the gas in the course of flowing through a throttle, instead of the temperature increase which is illustrated in FIG. 2.

Various measurement value transmitters can be used for measuring the temperature corresponding to the factors specific to the situation in each instance, for example, expansion thermometers, the measurement of resistance in metallic conductors and semiconductors, etc. It is preferable to provide a measurement of resistance due to the simple transmission of the measurement values. Well-known electronic measurement value monitoring installations and the like can be connected to the measurement points.

I claim:

1. Process for measuring the flow velocity of a liquid flowing in a conduit, characterized by the fact that the liquid velocity is locally changed at a predetermined location in the conduit by locally modifying the liquid flow, and the corresponding change of temperature of the liquid that results from change of internal friction resulting from such flow change is measured in said conduit by a plurality of spaced-apart measuring devices each of which is maintained substantially at the temperature of the flowing liquid and positioned at spaced points one of which is upstream of said location and another of which is positioned to sense a temperature rise in the liquid resulting from friction caused by such change of flow, and the flow velocity is determined from the resulting temperature rise, wherein said modifying of flow comprises a change in the flow direction and wherein said flow is disturbed at said location.

2. Process according to claim 1, characterized by the fact that the temperature of the liquid is measured at several points on the cross section of the line in order to compensate for any asymmetries in the distribution of the temperature which might occur.

3. Process according to claim 1, characterized by the fact that the influence of the ambient temperature on the viscosity of the liquid is compensated for by means of at least one additional measurement point.

4. Device for measuring the flow velocity of a liquid flowing in a conduit, characterized by the fact that said conduit has a region of variation in cross-section of flow, and wherein at least two temperature-sensitive measurement elements are installed in said conduit at a distance from each other, said elements being exposed to said liquid and maintained at substantially exactly the temperature of said liquid, in a manner to measure the temperature of said liquid upstream of said region of cross-section variation and the temperature of said liquid as a result of said change of cross-section, and wherein connection lines from said elements are passed through the wall of the conduit for transmitting the measured temperature, characterized by the fact that a section with a larger diameter is installed in a narrow line and is equipped with a stop with a throttle hole, the diameter of which corresponds to the diameter of the line, with the measurement elements being installed in the region of this throttle hole.

5. Device according to claim 4, characterized by the fact that an electrically conductive wire with thermocouple elements is installed along the center axis of the path of flow in said conduit.

6. Device according to claim 4, wherein at least one of said elements is positioned in a region of expansion of cross-section of flow.

7. Device according to claim 4, wherein at least one of said elements is positioned downstream of a throttle point in said conduit.

8. In a method for measuring the flow velocity of a liquid flowing in a conduit, wherein said conduit has a region of variation in cross-section of flow, creating a disturbance in the flow of the liquid, and wherein at least two temperature-sensitive measurement elements are installed in said conduit a distance from each other, the steps which comprise exposing said elements to said liquid and maintaining said elements at substantially exactly the temperature of said liquid, in a manner to measure the temperature of said liquid upstream of said region of cross-section variation and the temperature of said liquid as a result of said change of cross-section, and wherein connection lines from said elements are passed through the wall of the conduit for transmitting the measured temperatures, and wherein a section with a large diameter is installed in a narrow line and is equipped with a throttling hole, the diameter of which corresponds to the diameter of the line, and wherein the measurement elements are installed in the region of this throttle hole.

* * * * *